US010213951B2

(12) United States Patent
Kakinoki et al.

(10) Patent No.: US 10,213,951 B2
(45) Date of Patent: Feb. 26, 2019

(54) SHAPING ROLL FOR MELT EXTRUSION MOLDING, SHAPING ROLL ASSEMBLY FOR MELT EXTRUSION MOLDING, AND MELT EXTRUSION MOLDING METHOD

(71) Applicants: MITSUBISHI GAS CHEMICAL COMPANY, INC., Tokyo (JP); MGC FILSHEET CO., LTD., Saitama (JP)

(72) Inventors: Osamu Kakinoki, Tokyo (JP); Masahide Takeda, Tokyo (JP); Masataka Sugiyama, Saitama (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 311 days.

(21) Appl. No.: 15/301,817

(22) PCT Filed: Apr. 10, 2014

(86) PCT No.: PCT/JP2014/060422
§ 371 (c)(1),
(2) Date: Oct. 4, 2016

(87) PCT Pub. No.: WO2015/155873
PCT Pub. Date: Oct. 15, 2015

(65) Prior Publication Data
US 2017/0113395 A1    Apr. 27, 2017

(51) Int. Cl.
*B29C 47/88*    (2006.01)
*B29C 47/00*    (2006.01)
(Continued)

(52) U.S. Cl.
CPC ...... *B29C 47/8885* (2013.01); *B29C 33/3828* (2013.01); *B29C 43/46* (2013.01);
(Continued)

(58) Field of Classification Search
CPC ... B29C 43/46; B29C 47/8845; B29C 47/906; B29C 33/3828; B29L 2031/327; B29K 2995/0013

See application file for complete search history.

(56) References Cited

U.S. PATENT DOCUMENTS 5,048,745 A * 9/1991 Sato .................... B29C 33/3842
228/132
6,984,352 B1 * 1/2006 Akopyan ............ B29C 33/3828
264/219
(Continued)

FOREIGN PATENT DOCUMENTS

JP    39-22196    8/1964
JP    06-001834    1/1994
(Continued)

OTHER PUBLICATIONS

Extended European Search Report issued in Patent Application No. 14888676.5, dated Nov. 9, 2017.
(Continued)

*Primary Examiner* — Nahida Sultana
(74) *Attorney, Agent, or Firm* — Greenblum & Bernstein, P.L.C.

(57) ABSTRACT

A shaping roll for melt extrusion molding used for melt extrusion molding of thermoplastic resin, the shaping roll for melt extrusion molding comprises a metal roll body, a first cylinder, and a second cylinder. The metal roll body has a heat medium passage internally. The first cylinder covers a surface of a middle portion of the roll body part. The second cylinder covers surfaces of both end portions of the roll body part. The first cylinder comprises a first metal material having a thermal conductivity of 40 W/m·K or more. The second cylinder comprises a second metal material having a thermal conductivity of 20 W/m·K or less. The
(Continued)

first cylinder and the second cylinder are at least partially joined to each other.

22 Claims, 5 Drawing Sheets (51) Int. Cl.
   *B29C 43/46* (2006.01)
   *B29C 59/04* (2006.01)
   *B29C 47/90* (2006.01)
   *B29C 33/38* (2006.01)
   *B29L 31/32* (2006.01)

(52) U.S. Cl.
   CPC .......... *B29C 47/0021* (2013.01); *B29C 47/90* (2013.01); *B29C 59/04* (2013.01); *B29C 47/8845* (2013.01); *B29C 47/906* (2013.01); *B29K 2995/0013* (2013.01); *B29L 2031/324* (2013.01)

(56) References Cited

U.S. PATENT DOCUMENTS

| | | |
|---|---|---|
| 2006/0090839 A1 | 5/2006 | O'Dowd |
| 2007/0001333 A1 | 1/2007 | Dias et al. |
| 2010/0151156 A1* | 6/2010 | Kawabe .............. B29C 47/0021 428/1.31 |
| 2010/0239787 A1* | 9/2010 | Kasahara ............ B29C 47/0021 428/1.3 |
| 2012/0313288 A1 | 12/2012 | Meyer et al. |
| 2016/0221226 A1* | 8/2016 | Gerard .................. B29C 33/044 |

FOREIGN PATENT DOCUMENTS

| | | |
|---|---|---|
| JP | 8-141609 | 6/1996 |
| JP | 2003-53834 | 2/2003 |
| JP | 2005-321013 | 11/2005 |
| JP | 2008-543617 | 12/2008 |
| JP | 2009-166489 | 7/2009 |
| JP | 2009-248421 | 10/2009 |
| JP | 2009-248565 | 10/2009 |
| JP | 2010-36564 | 2/2010 |
| JP | 2012-232586 | 11/2012 |
| JP | 2013-10232 | 1/2013 |
| JP | 2013-27995 | 2/2013 |
| TW | 201249668 | 12/2012 |
| WO | 2007/005226 | 1/2007 |

OTHER PUBLICATIONS

International Search Report issued in PCT/JP2014/060422, dated Jun. 24, 2014.

* cited by examiner

SHAPING ROLL FOR MELT EXTRUSION MOLDING, SHAPING ROLL ASSEMBLY FOR MELT EXTRUSION MOLDING, AND MELT EXTRUSION MOLDING METHOD

TECHNICAL FIELD

The present invention relates to a shaping roll for melt extrusion molding, a shaping roll assembly for melt extrusion molding, and a melt extrusion molding method.

BACKGROUND ART

In the melt extrusion molding of a thermoplastic resin sheet, a shaping roll for melt extrusion molding that has a fine structure on its surface is used to transfer the fine structure to the surface of the sheet, so that various functions are given to the surface of a sheet molded article formed of thermoplastic resin. When a sheet molded article of thermoplastic resin having a fine structure on its surface is formed using melt extrusion molding, the transfer uniformity in the width direction, especially the transfer uniformity in the end part of the sheet molded article, is a major problem.

Generally, a sheet (often referred to below as a "sheet") of molten thermoplastic resin having flowed from the lip part of a T-die or coat hanger die is cooled by air in an air gap and the sheet temperature is significantly reduced before being pressed between a metal shaping roll (often referred to below as a "first roll") for melt extrusion molding and a pressing roll (often referred to below as a "second roll"). Since the degree of reduction of the temperature significantly differs between the sheet middle part and the sheet end part and the part of the sheet closer to the sheet end part is easily cooled, reduction of the temperature is larger in the part closer to the sheet end part. Accordingly, the transfer state of the fine structure of the surface of the first roll differs between the sheet middle part and the sheet end part, thereby producing non-uniformity in physical properties (for example, birefringence and thickness) between the sheet middle part and the sheet end part.

In a method for preventing non-uniformity in the transfer state and physical properties in the sheet width direction, temperature changes along the axial line of the first roll of the sheet in contact with the first roll are made different. Normally, the first roll internally has a heat medium passage for controlling the surface temperature of the first roll. When the distance from the heat medium passage to the surface of the first roll is short, the temperature changes of the sheet in contact with the first roll is larger than in the case in which the distance from the heat medium passage to the surface of the first roll is long. Accordingly, when the distance from the heat medium passage to the surface of the first roll in the vicinity of the end part of the first roll is longer than the distance from the heat medium passage to the surface of the first roll in the middle part of the first roll, the temperature changes of the part of the sheet in contact with the end part of the first roll can be made smaller than the temperature changes of the part of the sheet in contact with the middle part of the first roll. As a result, the transfer state and physical properties of the fine structure of the surface of the first roll can be made uniform between the sheet middle part and the sheet end part.

For example, the structure disclosed in FIGS. 11 and 12 of Japanese Unexamined Utility Model Application Publication No. 1994-001834 can reduce the distance from the heat medium passage to the surface of the first roll in the middle part of the first roll and increase the distance from the heat medium passage to the surface of the first roll in the end part of the first roll.

RELATED ART DOCUMENT

Patent Document

Patent Document 1: Japanese Unexamined Utility Model Application Publication No. 1994-001834

SUMMARY OF THE INVENTION

Problem to be Solved by the Invention

The structure disclosed in FIGS. 11 and 12 in Japanese Unexamined Utility Model Application Publication No. 1994-001834 is achieved by a so-called drilled roll created by opening a circular hole for a heat medium passage from the end surface of the first roll using a cutting drill. However, when the length of the first roll (metal shaping roll for melt extrusion molding) is large, machining using such a cutting drill becomes very difficult.

Accordingly, an object of the invention is to provide a shaping roll for melt extrusion molding that molds a sheet molded article (film molded article) minimizing the differences in physical properties between the middle part and the end part using a melt extrusion molding method, a shaping roll assembly for melt extrusion molding having such a shaping roll for melt extrusion molding, and a melt extrusion molding method using such a shaping roll assembly for melt extrusion molding.

SUMMARY OF THE INVENTION

To achieve the above object, a shaping roll for melt extrusion molding according to a first aspect of the invention used for melt extrusion molding of thermoplastic resin comprises, a metal roll body having a heat medium passage internally, a first cylinder covering a surface of a middle portion of the roll body part, and a second cylinder covering surfaces of both end portions of the roll body part, in which the first cylinder comprises a first metal material having a thermal conductivity of 40 W/m·K or more, the second cylinder comprises a second metal material having a thermal conductivity of 20 W/m·K or less, and the first cylinder and the second cylinder are at least partially joined to each other.

To achieve the above object, a shaping roll for melt extrusion molding according to a second aspect of the invention used for melt extrusion molding of thermoplastic resin comprises, a roll body part having a heat medium passage internally and cutouts on outer surfaces of both end portions and a cylindrical member fitted into the cutouts in the both end portions of the roll body part, in which the roll body part comprises a first metal material having a thermal conductivity of 40 W/m·K or more, the cylindrical member comprises a second metal material having a thermal conductivity of 20 W/m·K or less, and the cylindrical members are at least partially joined to the cutouts of the roll body part.

In the shaping roll for melt extrusion molding according to the first aspect or the second aspect of the invention, the upper limit value of the thermal conductivity of the first metal material may be 100 W/m·K and the lower limit value of the thermal conductivity of the second metal material may be 5 W/m·K, although the invention is not limited to these values.

To achieve the above object, a shaping roll assembly for melt extrusion molding according to the first aspect or the second aspect of the invention comprises a shaping roll (often referred to below as "first roll" for convenience) for melt extrusion molding and a pressure roll (often referred to below as "second roll" for convenience) disposed facing the shaping roll for melt extrusion molding, in which the shaping roll (first roll) for melt extrusion molding comprises the shaping roll for melt extrusion molding according to the first aspect or the second aspect of the invention.

To achieve the above object, a melt extrusion molding method according to the first aspect or the second aspect of the invention uses a shaping roll assembly for melt extrusion molding including a shaping roll (first roll) for melt extrusion molding and a pressure roll (second roll) disposed facing the shaping roll for melt extrusion molding, the shaping roll (first roll) for melt extrusion molding including the shaping roll for melt extrusion molding according to the first aspect or the second aspect, in which molten thermoplastic resin pushed out of a die is passed through a gap between the shaping roll (first roll) for melt extrusion molding and the pressure roll (second roll) to obtain a sheet molded article. The sheet molded article comprises a sheet, a film, or a film molded article.

In the shaping roll for melt extrusion molding according to the first aspect of the invention, the shaping roll for melt extrusion molding included in the shaping roll assembly for melt extrusion molding according to the first aspect of the invention, or the shaping roll for melt extrusion molding used for the melt extrusion molding method according to the first aspect of the invention (these shaping rolls for melt extrusion molding may be collectively referred to below as "first roll and the like according to the first aspect of the invention"), the second cylinder may cover the surfaces of the both end portions of the roll body part with an extension part of the first cylinder. Alternatively, the surfaces of the second cylinder may be covered with the extension part of the first cylinder. The second cylinder and the extension part of the first cylinder may be integrally screwed with each other, the second cylinder and the extension part of the first cylinder may be integrally shrink-fitted to each other, or the second cylinder and the extension part of the first cylinder may be integrally welded to each other. The ratio of the wall thickness of the second cylinder to the wall thickness of the extension part of the first cylinder may be 1/9 to 9/1, for example. The total wall thickness of the second cylinder and the extension part of the first cylinder may be 1 mm to 10 mm, for example. When the surface roughness of the first roll or the like according to the first aspect of the invention is important, the extension part of the first cylinder is desirably disposed externally. When the transferability is important, the second cylinder is desirably disposed externally. Such selection can be performed as appropriate depending on the differences in the specification and requirement of the first roll and the like according to the first aspect of the invention.

In the first roll and the like according to the first aspect of the invention including the above preferable implementations, a plating layer may be formed at least on the surface of the first cylinder. That is, a plating layer may be formed on the surface of the first cylinder or plating layers may be formed on the surfaces of the first cylinder and the second cylinder.

In the shaping roll for melt extrusion molding according to the second aspect of the invention, the shaping roll for melt extrusion molding included in the shaping roll assembly for melt extrusion molding according to the second aspect of the invention, or the shaping roll for melt extrusion molding used for the melt extrusion molding method according to the second aspect of the invention (these shaping rolls for melt extrusion molding may be collectively referred to below as "first roll and the like according to the second aspect of the invention"), plating layers may be formed on the surfaces of the roll body part and the cylindrical member.

In these cases, for example, nickel-phosphorus alloy, copper, nickel, or chrome may be included in the plating layer and an electroless plating method or an electrolytic plating method may be used. More specifically, the plating layer is preferably at least one plating layer selected from a group including, for example, a copper plating layer, a nickel plating layer, an electroless nickel-phosphorus plating layer, an electrolytic nickel-phosphorus plating layer, and a chrome plating layer. When a first roll having a fine convexo-concave structure on its surface is formed, it is preferable to configure a plating layer using copper or nickel having low Vickers hardness and good machinability. On the other hand, when high Vickers hardness is required, it is preferable to configure a plating layer using chrome. In addition, when moderately high Vickers hardness and micro-machinability are both required, it is preferable to configure a plating layer using nickel-phosphorus alloy. The thickness of a plating layer is 0.05 mm to 2.0 mm, for example. In the first roll and the like having the above preferable configuration according to the first aspect or the second aspect of the invention, a mat pattern, a prism pattern, or a micro lens array pattern may be formed on the surface of the plating layer. A mat pattern can be formed using sand blast, electric discharge machining, chemical etching, or other methods. In addition, a prism pattern or a micro lens array pattern can be formed by cutting or the like using a diamond cutting tool. Alternatively, an ornamental design for exterior material or the like can also be formed. The formation of a plating layer or the machining of an optical pattern on the surfaces (such as the first roll according to the first aspect of the invention) of the first cylinder and the second cylinder or on the surfaces of the roll body part and the cylindrical member (such as the first roll according to the second aspect of the invention) may be performed before the first cylinder and the second cylinder are attached to the roll body part, before the cylindrical member are attached to the roll body part, or after the cylindrical member are attached to the roll body part. However, when the formation or the machining is performed before the first cylinder and the second cylinder are attached to the roll body part or before the cylindrical member are attached to the roll body part, the plating layer may be scratched, the quality may be changed, or the cylindricality may be degraded by thermal distortion. Accordingly, the formation or the machining is desirably performed after the first cylinder and the second cylinder are attached to the roll body part or after the cylindrical member are attached to the roll body part.

In some cases, the first roll may be used as a mirror surface roll. That is, the surface of a plating layer may be a mirror surface. In this case, hard chrome layers are preferably formed on the surfaces of the first cylinder and the second cylinder using a plating method (for example, the first roll and the like according to the first aspect of the invention) or hard chrome layers are preferably formed on the surfaces of the roll body part and the cylindrical member using a plating method (for example, the first roll and the like according to the second aspect of the invention). A hard chrome layer is very hard, has good polishing performance, and does not easily get scratched. The surface roughness of a hard chrome layer preferably has a surface roughness of at least 0.2S or less (arithmetic average surface roughness of 50 nm or less). Since the polished surface is transferred when the first roll is used as a mirror surface roll, a plane sheet molded article can be made very flat. That is, the mirror surface transfer property of the sheet end part is improved and a thick part caused by the neck-in of the sheet end part is easily crushed, so the uniform press work of the entire surface can be performed and the surface accuracy is further improved as compared with the case in which a normal mirror surface roll is used.

Generally, in the melt extrusion molding of thermoplastic resin, molten thermoplastic resin flowing from the lip part of a die necks in at an air gap immediately before contact with the shaping roll for melt extrusion molding and the endmost part of a sheet molded article may become too thick to make control by adjustment of the lip opening. In the molding of an accurately shaped sheet molded article, the thick part of the endmost part of a sheet molded article is not preferable because it may become a transfer inhibition factor. Although a step may be formed in the roll end part so that the thick part of the endmost part does not undergo press work in a conventional art, such a step does not need to be provided in the roll end part in the first roll and the like according to the first aspect or the second aspect of the invention.

In addition, in the first roll and the like according to the first aspect of the invention including the various types of preferable configurations and implementations described above, the first cylinder and the second cylinder are shrink-fitted to the roll body part and, when the inner diameter of the first cylinder and the second cylinder at normal temperatures is $D_{2-i}$ and the outer diameter of the roll body part at normal temperatures is $D_{1-o}$, the following expression is preferably met.

$$0 \text{ mm} < D_{1-o} - D_{2-i} \leq 0.4 \text{ mm}$$

More preferably, the following expression is met.

$$0.05 \text{ mm} \leq D_{1-o} - D_{2-i} \leq 0.20 \text{ mm}$$

The outer diameter $D_{1-o}$ of the roll body part may be 200 mm to 800 mm and the wall thickness of the first cylinder and the second cylinder may be 1 mm to 10 mm, for example. The wall thickness of the first cylinder and the second cylinder is represented by the following expression when the outer diameter of the first cylinder and the second cylinder is $D_{2-o}$ at normal temperatures.

$$(D_{2-o} - D_{2-i})/2$$

Based on the selection of the materials (thermal conductivity) of the first cylinder and the second cylinder and the selection of the wall thickness of the first cylinder and the second cylinder, the degree of the cooling delay effect of molten thermoplastic resin in contact with the first roll by the first cylinder and the second cylinder can be controlled. In the temperature range from normal temperatures to 350° C., the linear expansion coefficients of the first cylinder and the second cylinder are preferably smaller than the linear expansion coefficient of the roll body part. This is because the first cylinder and the second cylinder are prevented from being loosened due to an increase in the temperature of the first roll when the first roll needs to be set to a predetermined set temperature during melt extrusion molding. However, when the linear expansion coefficients of the first cylinder and the second cylinder are larger than or substantially equal to the linear expansion coefficient of the roll body part, it is possible to prevent the first cylinder and the second cylinder from being loosened by making the shrink-fitting margin slightly larger and prevent the first cylinder and the second cylinder from rotating idle or being removed by spot-welding the ends of the first cylinder and the second cylinder to the roll body part.

In addition, in the first roll and the like according to the second aspect of the invention including the various types of preferable configurations and implementations described above, the cylindrical member is shrink-fitted to the roll body part and, when the inner diameter of the cylindrical member at normal temperatures is $D_{2-i}$ and the outer diameter in the cutout of the roll body part at normal temperatures is $D_{1-o}$, the following expression is preferably met.

$$0 \text{ mm} \leq D_{1-o} - D_{2-i} \leq 0.4 \text{ mm}$$

More preferably, the following expression is met.

$$0.05 \text{ mm} \leq D_{1-o} - D_{2-i} \leq 0.20 \text{ mm}$$

The outer diameter $D_{1-o}$ of the roll body part may be 200 mm to 800 mm and the wall thickness of the cylindrical member is 1 mm to 10 mm, for example. The wall thickness of the cylindrical member is represented by the following expression when the outer diameter of the cylindrical member at normal temperatures is $D_{2-o}$.

$$(D_{2-o} - D_{2-i})/2$$

Based on the selection of the materials (thermal conductivities) of the roll body part and the cylindrical member and the selection of the wall thickness of the cylindrical member, the degree of the cooling delay effect of molten thermoplastic resin in contact with the first roll can be controlled by the roll body part and the cylindrical member. This is because the cylindrical member is prevented from being loosened due to an increase in the temperature of the first roll when the first roll needs to be set to a predetermined set temperature during melt extrusion molding. However, when the linear expansion coefficient of the cylindrical member is larger than or substantially equal to the linear expansion coefficient of the roll body part, it is possible to prevent the cylindrical member from being loosened by making the shrink-fitting margin slightly larger and prevent the cylindrical member from rotating idle or being removed by spot-welding the end parts of the cylindrical member to the roll body part.

In addition, in the first roll and the like according the first aspect or the second aspect of the invention including the various types of preferable configurations and implementations described above, the first metal material preferably comprise, for example, carbon steel, chrome steel, chrome molybdenum steel, cast iron, or tungsten steel and, more preferably, for example, chrome molybdenum steel SCM440, which is structural alloy steel material, specifically. The second metal material preferably comprise, for example, nickel steel, stainless steel, nickel alloy, or Titanium (Ti). In addition, in the first roll and the like according to the first aspect of the invention, the metal material constituting the roll body part is preferably selected from the first metal material in terms of the strength and stiffness of material. That is, the roll body part preferably comprises the first metal material and, desirably, comprises the same material as in the first cylinder in order to prevent a trouble from being caused by differences in thermal properties such as a linear expansion coefficient. In particular, chrome molybdenum steel can be used as a preferable material. However, the invention is not limited to the material and, in some cases, the metal material may be selected from materials having thermal conductivities higher than in the first metal material. The thermal conductivities at normal temperatures of the individual materials are shown in Table 1 below.

TABLE 1

| | |
|---|---|
| Carbon steel | 45 to 53 W/m · K |
| Chrome steel | 52 to 60 W/m · K |
| Chrome molybdenum steel | 40 to 48 W/m · K |
| Cast iron | 48 W/m · K |
| Tungsten steel | 53 to 66 W/m · K |
| Nickel steel | 10 to 19 W/m · K |
| Stainless steel | 13 to 16 W/m · K |
| Nickel alloy | 9 to 17 W/m · K |
| Titanium | 17 W/m · K |

The machining accuracy of the surface of the roll body part is preferably as high as possible and the center run-out is preferably equal or less than $^{10}/_{1000}$ millimeters and, more preferably, equal or less than $^{5}/_{1000}$ millimeters. The surface roughness of the surface of the roll body part is preferably finished to at least approximately 0.4S by buffing. In the first roll and the like according to the first aspect of the invention, a thin plating layer having a thickness of 10 µm or less may be provided to prevent the roll body part from rusting. In addition, as in the roll body part, the machining accuracy of the first cylinder and the second cylinder is preferably as high as possible. In the first cylinder and the second cylinder, a high machining accuracy is required for the inner diameter $(D_{2-i})$ of the first cylinder and the second cylinder in addition to the outer diameter $(D_{2-o})$. Also in the first roll and the like according to the second aspect of the invention, as in the roll body part, the machining accuracy of the cylindrical member is preferably as high as possible and a high machining accuracy is required for the inner diameter $(D_{2-i})$ of the cylindrical member in addition to the outer diameter $(D_{2-o})$. In the outer diameter $(D_{2-o})$ and the inner diameter $(D_{2-i})$, the roundness is preferably suppressed to $^{5}/_{1000}$ millimeters or less and the cylindricality is preferably suppressed to $^{10}/_{1000}$ millimeters or less.

In addition, in the first roll and the like according to the first aspect of the invention including the various types of preferable configurations and implementations described above, when the width of the sheet molded article shaped by melt extrusion molding using the shaping roll for melt extrusion molding is $W_0$ and the length of the first cylinder is $X_1$, the following expression is preferably met.

$W_0 > X_1$

Alternatively, the following expression is preferably met.

$30 \text{ mm} \leq W_0 - X_1 \leq 300 \text{ mm}$

In addition, when the length of the second cylinder is $X_2$, the following expression is preferably met.

$30 \text{ mm} \leq X_2 \leq 300 \text{ mm}$

In addition, the following expression is preferably met.

$(X_1 + 2 \cdot X_2) > W_0 + 30 \text{ (mm)}$

The total length of the first cylinder and the second cylinder may be equal to the effective length of the roll body part or shorter than the effective length of the roll body part. The state in which the region of $X_2$ overlaps the end part of the sheet molded article by 30 mm or more is preferable.

In addition, in the first roll and the like according to the second aspect of the invention including the various types of preferable configurations and implementations described above, when the width of the sheet molded article shaped by melt extrusion molding using the shaping roll for melt extrusion molding is $W_0$ and the length of the portion of the roll body part between cutouts of the roll body part is $X_1$, the following expression is preferably met.

$W_0 > X_1$

Alternatively, the following expression is preferably met.

$30 \text{ mm} \leq W_0 - X_1 \leq 300 \text{ mm}$

In addition, when the length of the cylindrical member is $X_2$, the following expression is preferably met.

$30 \text{ mm} \leq X_2 \leq 300 \text{ mm}$

In addition, the following expression is preferably met.

$(X_1 + 2 \cdot X_2) > W_0 + 30 \text{ (mm)}$

The state in which the region of $X_2$ overlaps the end part of the sheet molded article by 30 mm or more is preferable.

In the first roll and the like according to the first aspect of the invention, to reach the state in which the first cylinder and the second cylinder are at least partially joined to each other, it is sufficient to, for example, weld or pressure-join the facing surfaces of the first cylinder facing the second cylinder to the facing surfaces of the second cylinder facing the first cylinder. Specifically, it is sufficient to select an appropriate method from a welding method such as an arc welding method melting and integrating the first cylinder and the second cylinder, a pressure welding method such as a resistance welding method, a blacksmith welding method, or a friction pressure welding method by bringing the facing surfaces of the first cylinder and the facing surfaces of the second cylinder into close contact and performing metal fusion between atoms by applying heat and pressure to be joined, and a brazing method joining the first cylinder and the second cylinder through wettability phenomenon without melting these cylindrical member by using brazing material which is an alloy having a low melting point than the first metal material and the second metal material. If a step or a projection is generated in the joined portion after joining, the surface accuracy only needs to be corrected by performing cylindrical cutting or cylindrical grinding of the joint between the first cylinder and the second cylinder.

In the first roll and the like according to the second aspect of the invention, to reach the state in which the roll body part and the cylindrical member are at least partially joined to each other, it is sufficient to, for example, weld or pressure-join the facing surfaces of the cutouts of the roll body part facing the cylindrical member to the facing surfaces of the cylindrical member facing the cutouts of the roll body part. Specifically, it is sufficient to select an appropriate method from a welding method such as an arc welding method melting and integrating the roll body part and the cylindrical member, a pressure welding method such as a resistance welding method, a blacksmith welding method, or a friction pressure welding method by bringing the facing surfaces of the roll body part and the facing surfaces of the cylindrical member into close contact and performing metal fusion between atoms by applying heat and pressure to be joined, and a brazing method joining the roll body part and the cylindrical member through wettability phenomenon without melting the roll body part and the cylindrical member by using brazing material which is an alloy having a low melting point than the first metal material and the second metal material. If a step or a projection is generated in the joined portion after joining, the surface accuracy only needs to be corrected by performing cylindrical cutting or cylindrical grinding of the joint between the roll body part and the cylindrical member.

In the first roll and the like according to the first aspect or the second aspect of the invention, the roll body part may be a so-called drilled roll having a heat medium passage formed into a circular pipe by a cutting drill so as to extend from the side of the roll body part in parallel with the axial direction or a double-pipe roll (also referred to as a spiral roll) having a spiral heat medium passage. The number of heat medium passages is essentially arbitrary. The heat medium may be water or thermal oil.

In addition, in the melt extrusion molding method according to the first aspect or the second aspect of the invention including the above preferable implementations and configuration, the obtained sheet molded article may be configured to have a thickness of 0.05 mm to 0.5 mm. In addition, in the shaping roll for melt extrusion molding, the shaping roll assembly for melt extrusion molding, or the melt extrusion molding method according to the first aspect or the second aspect of the invention including the above preferable implementations and configuration and including such configurations, although the thermoplastic resin may be selected from a group including polycarbonate resin, acrylic resin, polystyrene resin, thermoplastic polyester resin, annular polyolefin resin, and polymethyl-1-pentene resin, particularly, polycarbonate resin is preferable. An addition agent such as a heat stabilizer, a mold release agent, or a UC absorber may be applied to these types of resin as appropriate. In addition, the obtained sheet molded article may be a light diffusion sheet or the obtained sheet molded article may be a brightness enhancement sheet. Normally, a mat pattern is formed on the light diffusion sheet and a prism pattern is formed on the brightness enhancement sheet.

A melt extrusion molding machine included in a melt extrusion molding apparatus may be a well-known melt extrusion molding machine. The melt extrusion molding machine normally comprises a die, a heating cylinder (also referred to as a barrel) for plasticizing and melting raw material thermoplastic resin, and a hopper, attached to the heating cylinder, that supplies the raw material thermoplastic resin to the heating cylinder. As a melt extrusion molding machine appropriate for use in the melt extrusion molding method according to the first aspect or the second aspect of the invention, a well-known single-shaft extrusion machine including a vent type extrusion machine or a tandem type extrusion machine or a well-known double-shaft extrusion machine including a parallel type double-shaft extrusion machine or a conical type double-shaft extrusion machine. In addition, the structure, composition, and type of the die are essentially arbitrary and the die may be a T-die or a coat hanger die. Generally, the heating cylinder comprises a supply unit (feed zone), a compression unit (compression zone), and a metering unit (metering zone) and the die is disposed downstream of the metering unit and the hopper is attached to the supply unit. Depending on the melt extrusion molding machine to be used, the heating cylinder may need to be modified so as to have a hermetical structure and introduce inactive gas. The raw material thermoplastic resin supplied to the hopper is sent to the compression unit as a solid from the supply unit of the heating cylinder, plasticized and melted before and after the compression unit, metered by the metering unit, and ejected after passing through the die. When an exhaust opening (vent unit) is provided, the exhaust opening (vent unit) is desirably provided in the compression unit or in a position downstream of (for example, between the compression unit and the metering unit) the compression unit. The types, compositions, and structures of the heating cylinder, screw, and hopper are essentially arbitrary and may be a known heating cylinder, screw, or hopper.

As the roll assembly according to the invention, it is possible to use a molding apparatus only for single-sided pressing, specific to a thin sheet molded article, that is appropriate for the molding of a sheet molded article having a thickness of 300 μm or less or use a molding apparatus having a structure of three rolls for double-sided pressing, specific to a thick sheet molded article, that is appropriate for the molding of a sheet molded article having a thickness of 300 μm or more. In the sheet molding apparatus, the roll may be installed vertically, horizontally, or in a hybrid manner. The second roll (pressure roll) may be a metal rigid roll, a metal elastic roll, a rubber roll, or the like. The metal elastic roll comprises a roll having a metal outer cylinder of a small thickness (2 mm or so) or a rubber roll surrounded by a thin metal sleeve.

The pressing pressure (line pressure obtained by dividing the pressing force by the width of the sheet molded article) between the first roll and the second roll is arbitrary within the allowable range of the roll stiffness, but the pressing pressure is preferably 5 to 50 kg/cm. The set temperature of the first roll is often set to a value approximately 10 degrees smaller than the glass transition temperature of the resin used, but the temperature may be adjusted as appropriate according to the degree of occurrences of appearance failure caused by failure of separation.

Although the molding speed of a sheet molded article can also be appropriately adjusted according to the thickness of a sheet molded article, preferably, the molding speed is approximately 2 m/min to 20 m/min to prevent occurrence of transfer failure phenomenon due to resin cooling failure. In this speed range, the cooling delay effect of the shaping roll for melt extrusion molding according to the invention becomes most apparent, thereby easily facilitating both the improvement of transfer performance and the suppression of separation failure phenomenon.

Effects of the Invention

The first roll and the like according to the first aspect of the invention comprises the roll body part, the first cylinder, and the second cylinder and the thermal conductivity of the first metal material of the first cylinder and the thermal conductivity of the second metal material of the second cylinder are defined. In addition, the first roll and the like according to the second aspect of the invention comprises the roll body part and the cylindrical member and the thermal conductivity of the first metal material of the roll body part and the thermal conductivity of the second metal material of the cylindrical member are defined. Therefore, the cooling speed appropriate for manufacturing a sheet molded article of thermoplastic resin can be obtained. In addition, since the first cylinder or the roll body part comprises the first metal material having a high thermal conductivity and the second cylinder or the cylindrical member comprise the second metal material having a low thermal conductivity, the cooling of molten thermoplastic resin (sheet) immediately after contact with the second cylinder or the cylindrical member is delayed and the time required to transfer an optical pattern and the like can be obtained. Accordingly, the transfer rate of an optical pattern and the like can be improved and the sheet molded article immediately before separation from the first cylinder or the roll body part is sufficiently cooled, so generation of peeling marks in the sheet molded article can be effectively prevented. Accordingly, it is possible to obtain a sheet molded article (film molded article) minimizing the differences in physical properties between the middle part and the end part.

EMBODIMENTS FOR CARRYING OUT THE INVENTION

The invention will be described below based on embodiments with reference to the drawings. However, the invention is not limited to the embodiments and values and materials in the embodiments are only examples.

Embodiment 1

Figure 1A:
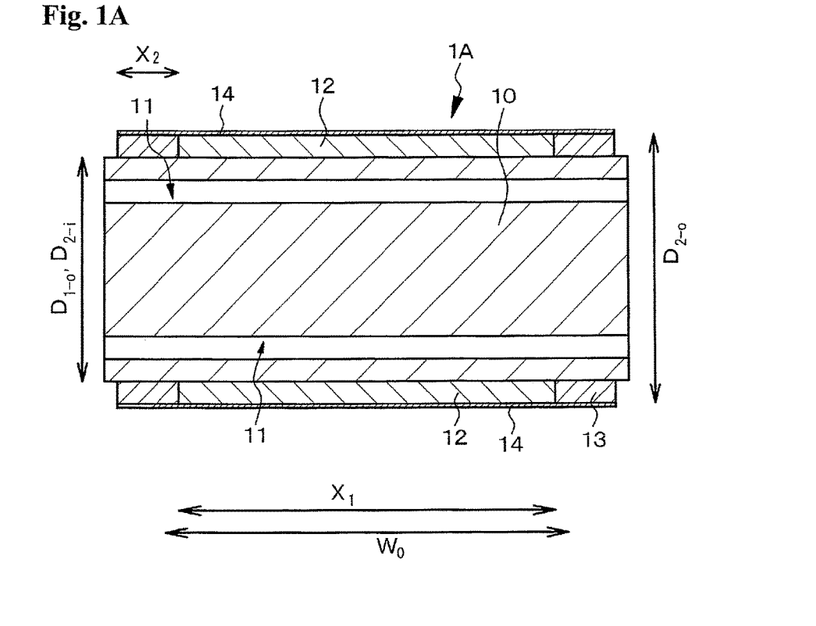
FIG. 1A is a cross sectional view schematically illustrating a shaping roll for melt extrusion molding according to embodiment 1

Embodiment 1 relates to the shaping roll for melt extrusion molding, the shaping roll assembly for melt extrusion molding, and the melt extrusion molding method according to the first aspect of the invention. FIG. 1A is a cross sectional view schematically illustrating a shaping roll 1A (first roll) for melt extrusion molding according to embodiment 1 taken along a virtual plane including an axial line and FIG. 1B is a conceptual view illustrating the disposition of a die and a shaping roll assembly for melt extrusion molding according to embodiment 1.

The first roll 1A according to embodiment 1 is a shaping roll for melt extrusion molding used for melt extrusion molding of thermoplastic resin and comprises a metal roll body 10 having a heat medium passage 11 internally, a first cylinder 12 covering a surface of a middle portion of the roll body part 10, and second cylinders 13 covering surfaces of both end portions of the roll body part 10. The first cylinder 12 comprises a first metal material having a thermal conductivity of 40 W/m·K or more and the second cylinders 13 comprise a second metal material having a thermal conductivity of 20 W/m·K or less, and the first cylinder 12 and the second cylinders 13 are at least partially joined to each other. The first metal material of the first cylinder 12 and the second metal material of the second cylinders 13 are specifically indicated in Table 2 below.

Figure 1B:
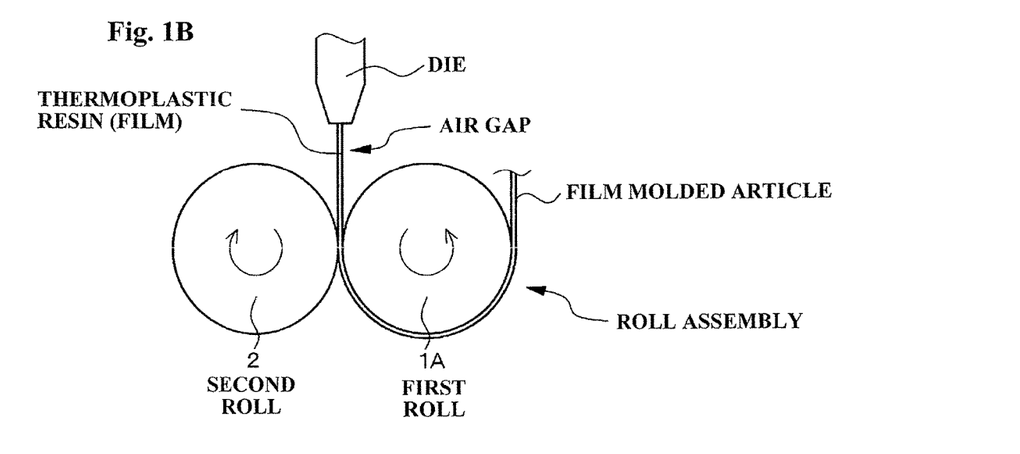
FIG. 1B is a conceptual view illustrating the disposition of a die and a shaping roll assembly for melt extrusion molding according to embodiment 1.

As illustrated in FIG. 1B, the shaping roll assembly for melt extrusion molding according to embodiment 1 comprises the first roll 1A according to embodiment 1 described above and a second pressure roll 2 disposed facing the first roll 1A. In embodiment 1, the second roll 2 comprises a rubber roll made of fluororesin.

The first cylinder 12 and the second cylinders 13 are shrink-fitted to the roll body part 10. The value of the inner diameter $D_{2-i}$ of the first cylinder 12 and the second cylinders 13 at normal temperatures and the value of the outer diameter $D_{1-o}$ of the roll body part 10 at normal temperatures are indicated in Table 2 below. That is, the shrink-fitting margin is assumed to be 0.1 mm. In addition, the wall thickness of the first cylinder 12 and the second cylinders 13 is assumed to be 7.00 mm. In embodiment 1, the roll body part 10 is assumed to be a so-called drilled roll having the heat medium passage 11 formed into a circular pipe by a cutting drill so as to extend from the side of the roll body part 10 in parallel with the axial direction. The number of heat medium passages 11 is essentially arbitrary. Thermal oil is used as the heat medium of the roll body part 10. Although the linear expansion coefficients of the first metal material and the second metal material of the first cylinder 12 and the second cylinders 13 are slightly larger than the linear expansion coefficient of the metal material of the roll body part 10, it is possible to prevent the first cylinder 12 and the second cylinders 13 from being loosened by making the shrink-fitting margin slightly larger. In some cases, the end parts of the second cylinders 13 may be spot-welded to the roll body part 10 to prevent them from rotating idle or being removed.

Plating layers 14 (specifically, 0.1-mm-thick electrolytic nickel plating layers) are formed on the surfaces of the first cylinder 12 and the second cylinders 13 having the surface roughness polished to approximately 0.7S. Buffing is applied to the surface of the plating layer 14 and then fine convexo-concave shapes are formed on the surface using a sand blasting method. Formation of the plating layers 14 and the optical pattern on the surfaces of the first cylinder 12 and the second cylinders 13 was performed after attachment of the first cylinder 12 and the second cylinders 13 to the roll body part 10. The transparent replicas of the surfaces (plating layers 14) of the first cylinder 12 and the second cylinders 13 were manufactured using UV-curable resin GLX18-73N (refraction index of 1.49) manufactured by Gluelabo Ltd. and the haze value (turbidity) was measured. As a result, the haze values were 86% and 85% and the surface roughness of the first cylinder 12 was substantially the same as the surface roughness of the second cylinders 13.

When the width of the sheet molded article formed by melt extrusion molding using the shaping roll for melt extrusion molding is $W_0$ and the length of the first cylinder 12 is $X_1$, the following expression is met.

$$W_0 > X_1$$

Alternatively, the following expression is met.

$$30 \text{ mm} \leq W_0 - X_1 \leq 300 \text{ mm}$$

When the length of the second cylinders 13 is $X_2$, the following expression is met.

$$30 \text{ mm} \leq X_2 \leq 300 \text{ mm}$$

In addition, when the length of the second cylinders 13 is $X_2$, the following expression is met.

$$(X_1+2 \cdot X_2) > W_0 + 30 \text{ (mm)}$$

The values of $X_1$ and $X_2$ and the value of $W_0$ are specifically indicated in Table 2 below. The total length $(X_1+2 \cdot X_2)$ of the first cylinder 12 and the second cylinders 13 is the same as the face length of the roll body part 10. The state in which the region of $X_2$ overlaps the end part of the sheet molded article by 30 mm or more is preferable.

TABLE 2

| Metal material of the roll body part | S45C |
|---|---|
| Thermal conductivity | 45 W/m · K |
| Linear expansion coefficient | 12 × 10⁻⁶ mm/mm · K |
| First metal material | S25C |
| Thermal conductivity | 50 W/m · K |
| Linear expansion coefficient | 12 × 10⁻⁶ mm/mm · K |
| Second metal material | SUS309 |
| Thermal conductivity | 14 W/m · K |
| Linear expansion coefficient | 15 × 10⁻⁶ mm/mm · K |
| $D_{1-o}$ | 386.0 mm |
| $D_{2-I}$ | 385.8 mm |
| $D_{2-o}$ | 400.0 mm |
| $X_1$ | 300 mm |
| $X_2$ | 195 mm |
| $W_0$ | 450 mm |

In embodiment 1, polycarbonate resin (polycarbonate resin "lupilon H3000" manufactured by Mitsubishi Engineering-Plastics Corporation) was used as the thermoplastic resin. In addition, the nominal thickness of the sheet molded article (film molded article) obtained by the melt extrusion molding method in embodiment 1 is 130 μm and the width $W_0$ is indicated in Table 2. The obtained sheet molded article (film molded article) is a light diffusion sheet (light diffusion film) and a mat pattern is formed thereon.

In embodiment 1, a well-known melt extrusion molding apparatus is used to pass molten thermoplastic resin pushed out of the die through the gap between the first roll 1A and the second roll 2 and apply a pressure to the sheet type molten thermoplastic resin to obtain the sheet molded article (film molded article). The molding conditions are indicated in Table 3 below.

TABLE 3

| Die temperature | 270° C. |
|---|---|
| Line speed | 7 m/min |
| First roll temperature | 140° C. |
| Second roll temperature | 70° C. |
| Line pressure level | 6 kg/cm |

A first roll was manufactured as comparative example 1 in the same way as in embodiment 1 except the use of cylindrical members made of S45C (having the same dimensions as the cylindrical members obtained by integrating the first cylinder 12 and the second cylinders 13 according to embodiment 1). The transparent replicas of the surfaces (plating layers) of the cylindrical members were manufactured using UV-curable resin GLX18-73N and the haze value was measured. As a result, the haze value was 86%, which indicates substantially the same surface shape as in embodiment 1. A sheet molded article (film molded article) was molded under conditions substantially the same as in embodiment 1.

Figure 5:
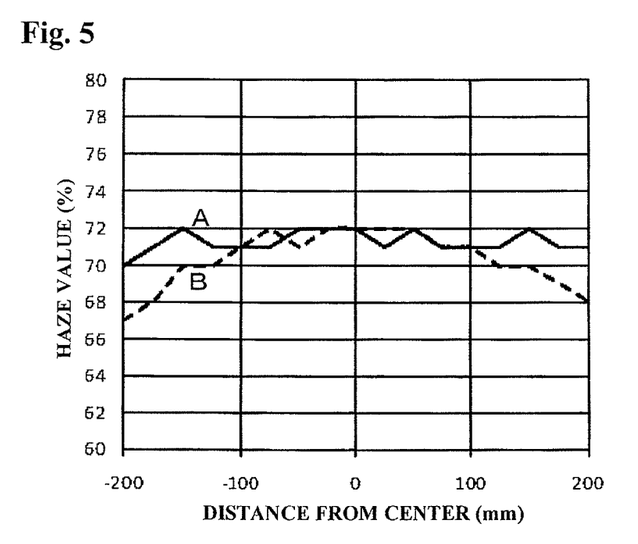
FIG. 5 is a graph indicating the result of measurement of haze values of sheet molded articles molded using the shaping roll for melt extrusion molding according to embodiment 1 and a shaping roll for melt extrusion molding according to comparative example 1.

FIG. 5 indicates the measurement results of the haze values of sheet molded articles that have been molded using the first roll according to embodiment 1 and the first roll according to comparative example 1. In FIG. 5, "A" indicates the measurement result using the first roll according to embodiment 1 and "B" indicates the measurement result using the first roll according to comparative example 1. In embodiment 1, in the sheet molded article (film molded article) that has been molded, there is no appearance failure such as a peeling mark caused by failure of separation from the first cylinder 12 and the haze values were 71% to 72% in the middle part and 70% to 72% in the end part, so a difference in the haze values was hardly observed between the middle part and the end part. In contrast, in comparative example 1, there is no appearance failure such as a peeling mark caused by failure of separation from the cylindrical members in the sheet molded article (film molded article) that has been molded, but the haze values were 71% to 72% in the middle part and 67% to 70% in the end part, so a difference (approximately 3%) in the haze values was observed between the middle part and the end part.

As described above, in embodiment 1, the first roll 1A comprises the roll body part 10, the first cylinder 12, and the second cylinders 13 and the thermal conductivity of the first metal material of the first cylinder 12 and the thermal conductivity of the second metal material of the second cylinders 12 are defined. Accordingly, the cooling speed appropriate for manufacturing the sheet molded article of thermoplastic resin can be obtained. In addition, since the second cylinders 13 are made of the second metal material having a low thermal conductivity, the cooling of the molten thermoplastic resin (sheet) immediately after contact with the second cylinders 13 is delayed and the time required to transfer an optical pattern and the like can be obtained and the transfer rate of an optical pattern and the like can be improved. In addition, since the roll body part 10 is made of the first metal material and the sheet molded article immediately before separation from the second cylinders 13 is sufficiently cooled, the generation of peeling marks can be prevented effectively. As a result, the sheet molded article (film molded article) having no difference in the haze values between the middle part and the end part could be obtained.

Embodiment 2

Figure 2:
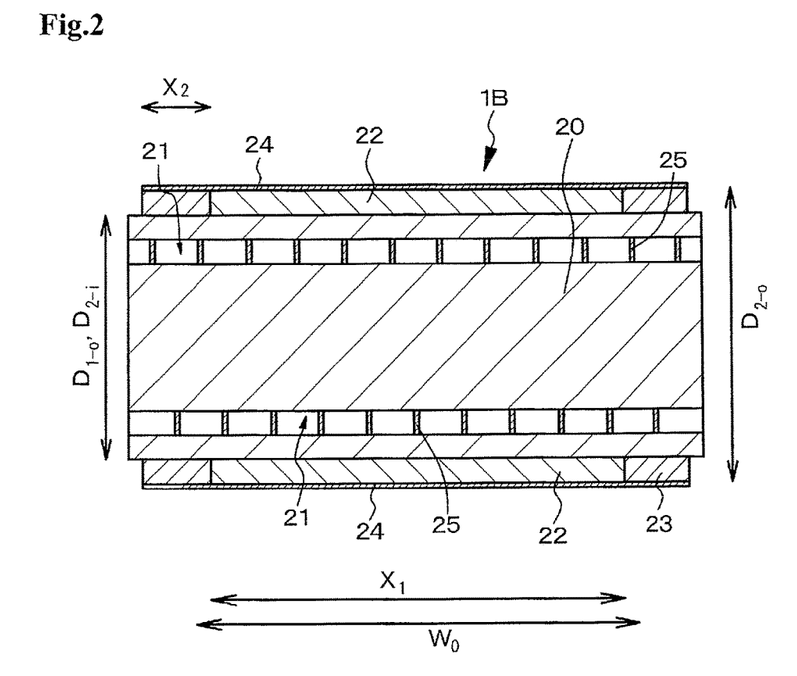
FIG. 2 is a cross sectional view schematically illustrating a shaping roll for melt extrusion molding according to embodiment 2.

Embodiment 2 is a modification of embodiment 1. FIG. 2 is a cross sectional view schematically illustrating a shaping roll (first roll) 1B for melt extrusion molding according to embodiment 2 when the first roll is taken along a virtual plane including the axial line.

In embodiment 2, a roll body part 20 is also referred to as a spiral roll and a heat medium passage 21 is a spiral double-pipe roll. The specifications of the roll body part 20, a first cylinder 22, and second cylinders 23 of the first roll 1B according to embodiment 2 are indicated in Table 2. As in embodiment 1, the first cylinder 22 and the second cylinders 23 are shrink-fitted to the roll body part 20 and the shrink-fitting margin and the wall thickness of the first cylinder 22 and the second cylinders 23 are the same as in embodiment 1. In the heat medium passage 21, there is a continuous dividing wall (partitioning wall) 25 extending spirally along the axial line of the roll body part 20. The number of dividing walls 25 is essentially arbitrary. Heat medium oil was used as the heat medium of the roll body part 20.

In addition, an approximately 0.3-mm-thick electrolytic nickel-phosphorus plating layer 24 was formed on the surfaces of the first cylinder 22 and the second cylinders 23 and a prism pattern having a nominal pitch of 100 μm, a nominal height of 50 μm, and a nominal angle of 90 degrees was provided by cut machining using a diamond cutting tool. Unlike embodiment 1, a metal elastic roll covered with hard chrome plating was used as the second roll 2.

In embodiment 2, polycarbonate resin "lupilon H3000" was used as in embodiment 1. In addition, the nominal thickness of a sheet molded article (film molded article) obtained by a melt extrusion molding method according to embodiment 2 is 300 μm. The obtained sheet molded article (film molded article) is a brightness improvement sheet (brightness improvement film) and a prism pattern is formed thereon.

Also in embodiment 2, a well-known melt extrusion molding apparatus is used to pass molten thermoplastic resin pushed out of the die through the gap between the first roll 1B and the second roll 2 and apply a pressure to the sheet type molten thermoplastic resin to obtain the sheet molded article (film molded article). The molding conditions are indicated in Table 4 below.

TABLE 4

| | |
|---|---|
| Die temperature | 280° C. |
| Line speed | 5 m/min |
| First roll temperature | 135° C. |
| Second roll temperature | 120° C. |
| Line pressure level | 10 kg/cm |

The appearance of the prism film having been molded was good. Specifically, the average transfer rate in the middle part of the sheet molded article (film molded article) having been molded was 85% and the average transfer rate in the end part was 84%, so a difference in the average transfer rate was hardly observed between the middle part and the end part. In addition, since the thick portion at the edge of the sheet molded article was easily pressed, the transfer rate was relatively improved.

The first roll was manufactured as comparative example 2 in the same way as in embodiment 2 except the use of cylindrical members made of S45C (having the same dimensions as the cylindrical members obtained by integrating the first cylinder 22 and the second cylinders 23 according to embodiment 2). Then, a sheet molded article (film molded article) was manufactured under the same conditions as in embodiment 2. The average transfer rate in the middle part of the sheet molded article (film molded article) having been molded was 83% and the average transfer rate in the end part was 80%, so the transfer rates are relatively low and a difference in the average transfer rate was observed between the middle part and the end part.

Embodiment 3

Figure 3A:
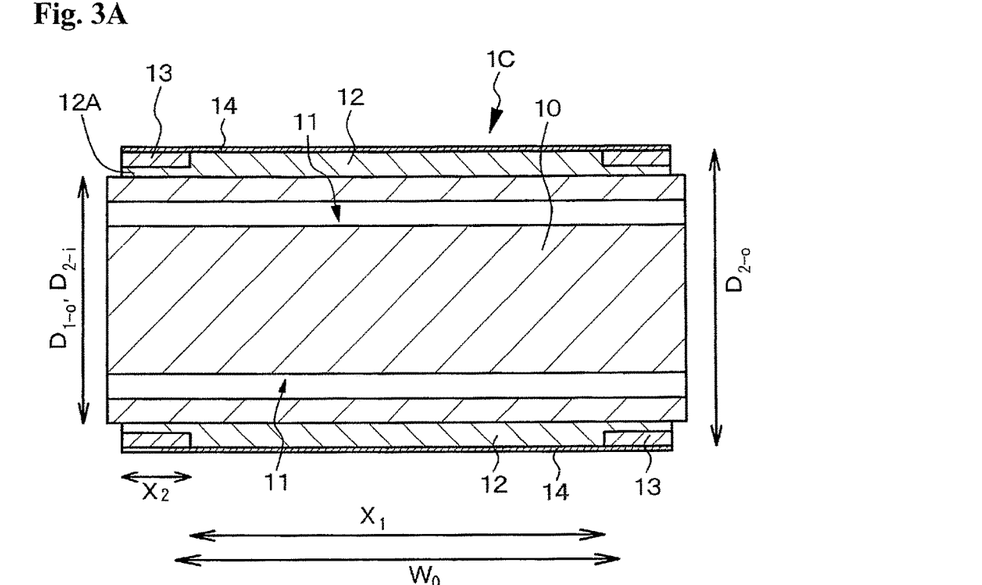
FIG. 3A is a cross sectional view schematically illustrating a shaping roll for melt extrusion molding according to embodiment 3
Figure 3B:
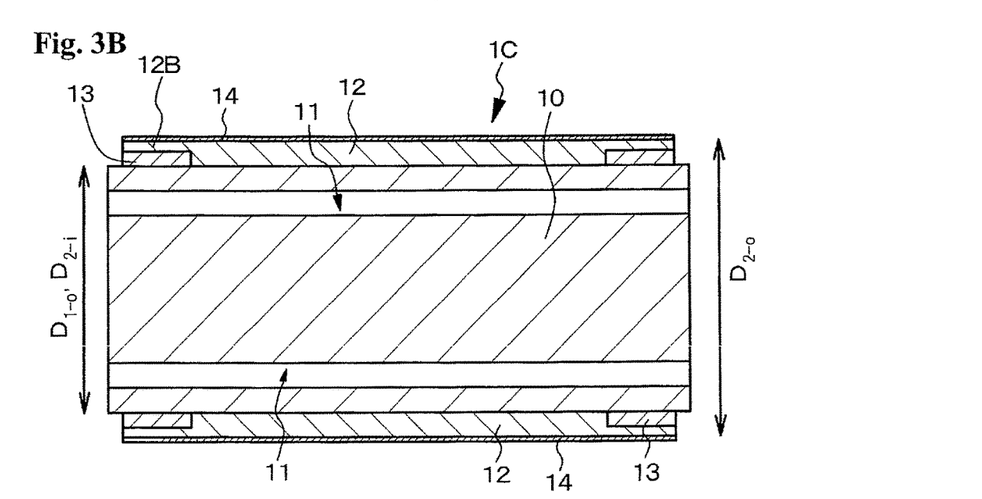
FIG. 3B is a cross sectional view schematically illustrating a modification of the shaping roll for melt extrusion molding according to embodiment 3.

Embodiment 3 is a modification of embodiment 1 or embodiment 2. FIG. 3A or FIG. 3B illustrates a cross sectional view schematically illustrating a shaping roll (first roll) for melt extrusion molding. A first roll 1C illustrated in FIG. 3A and FIG. 3B is a modification of the first roll according to embodiment 1. In embodiment 3, the second cylinders 13 cover the surfaces of both end portions of the roll body part 10 with extension parts 12A of the first cylinder. The extension parts 12A of the first cylinder are in contact with the roll body part 10 and the second cylinders 13 are disposed on the extension parts 12A of the first cylinder. Specifically, threads (not illustrated) are formed on the internal surfaces of the second cylinders 13 and the outer surfaces of the extension parts 12A of the first cylinder, so that the second cylinders 13 and the extension parts 12A of the first cylinder are integrally screwed with each other.

However, the integration of the second cylinders 13 and the extension parts 12A of the first cylinder is not limited to such a method. The second cylinders 13 may be integrally shrink-fitted to the extension parts 12A of the first cylinder or the second cylinders 13 may be integrally welded to the extension parts 12A of the first cylinder.

Molding was performed using the first roll 1C according to embodiment 3 illustrated in FIG. 3A. The specifications of the first roll 1C and the like are indicated in Table 5. The roll body part 10 is made of the first metal material as in the first cylinder 12. Also in embodiment 3, as in embodiment 2, an approximately 0.3-mm-thick electroless nickel-phosphorus plating layer 14 was formed on the surfaces of the first cylinder 12 and second cylinders 13, a prism pattern having a nominal pitch of 100 μm, a nominal height of 50 μm, and a nominal angle of 90 degrees was provided in a 700-mm-long part of the first roll 1C by cut machining using a diamond cutting tool. Unlike embodiment 1, a metal elastic roll covered with hard chrome plating was used as the second roll 2 as in embodiment 2.

TABLE 5

| | |
|---|---|
| Metal material of the roll body part | SCM440 |
| Thermal conductivity | 43 W/m · K |
| Linear expansion coefficient | $12 \times 10^{-6}$ mm/mm · K |
| First metal material | SCM440 |
| Second metal material | SUS309 |
| Thermal conductivity | 14 W/m · K |
| Linear expansion coefficient | $15 \times 10^{-6}$ mm/mm · K |
| $D_{1\text{-}o}$ | 270.0 mm |
| $D_{2\text{-}I}$ | 269.8 mm |
| $D_{2\text{-}o}$ | 300 mm |
| Wall thickness of the extension parts of the first cylinder | 7.5 mm |
| Wall thickness of the second cylinders | 7.5 mm |
| $X_1$ | 580 mm |
| $X_2$ | 160 mm |
| $W_0$ | 680 mm |

In embodiment 3, polycarbonate resin (polycarbonate resin "lupilon S3000" manufactured by Mitsubishi Engineering-Plastics Corporation) was used as the thermoplastic resin. In addition, the nominal thickness of a sheet molded article (film molded article) obtained by a melt extrusion molding method in embodiment 3 is 300 μm. The obtained sheet molded article (film molded article) is a brightness improvement sheet (brightness improvement film) and a prism pattern is formed thereon.

In embodiment 3, a well-known melt extrusion molding apparatus is used to pass molten thermoplastic resin pushed out of an 800-mm-wide die through the gap between the first roll 1C and the second roll 2 and apply a pressure to the sheet type molten thermoplastic resin to obtain the sheet molded article (film molded article). The molding conditions are indicated in Table 6 below.

TABLE 6

| | |
|---|---|
| Die temperature | 290° C. |
| Line speed | 5 m/min |
| First roll temperature | 135° C. |
| Second roll temperature | 120° C. |
| Line pressure level | 20 kg/cm |

The first roll was manufactured as comparative example 3 in the same way as in embodiment 3 except the use of cylindrical members made of SCM440 (having the same dimensions as the cylindrical members obtained by integrating the first cylinder 12 and the second cylinders 13 according to embodiment 3). A sheet molded article (film molded article) was molded under conditions substantially the same as in embodiment 3.

Also in embodiment 3, a well-known melt extrusion molding apparatus is used to pass molten thermoplastic resin pushed out of the die through the gap between the first roll 1C and the second roll 2 and apply a pressure to the sheet type molten thermoplastic resin to obtain a sheet molded article (film molded article). The appearance of the prism film having been molded was good. Specifically, the average transfer rate in the middle part of the sheet molded article (film molded article) having been molded was 75% and the average transfer rate in the end part was 76%, so a difference in the average transfer rate is hardly observed between the middle part and the end part. In addition, since the thick portion at the edge of the sheet molded article is easily pressed, the transfer rate was relatively improved. In contrast, in comparative example 3, the average transfer rate in the middle part of the sheet molded article (film molded article) having been molded was 75% and the average transfer rate in the end part was 71%, so a significant difference in the average transfer rate was observed between the middle part and the end part.

The shaping roll for melt extrusion molding (first roll), the shaping roll assembly for melt extrusion molding, and the melt extrusion molding method using the first roll according to embodiment 3 can be the same as the first roll, the shaping roll assembly for melt extrusion molding, and the melt extrusion molding method using the first roll according to embodiment 1 or 2 except the points described above, so detailed descriptions are omitted.

As illustrated in FIG. 3B, the surface of the second cylinders 13 may be covered with extension parts 12B of the first cylinder. In such implementation, the plating layer 14 is formed on the surface of the first cylinder 12.

Embodiment 4

Figure 4A:
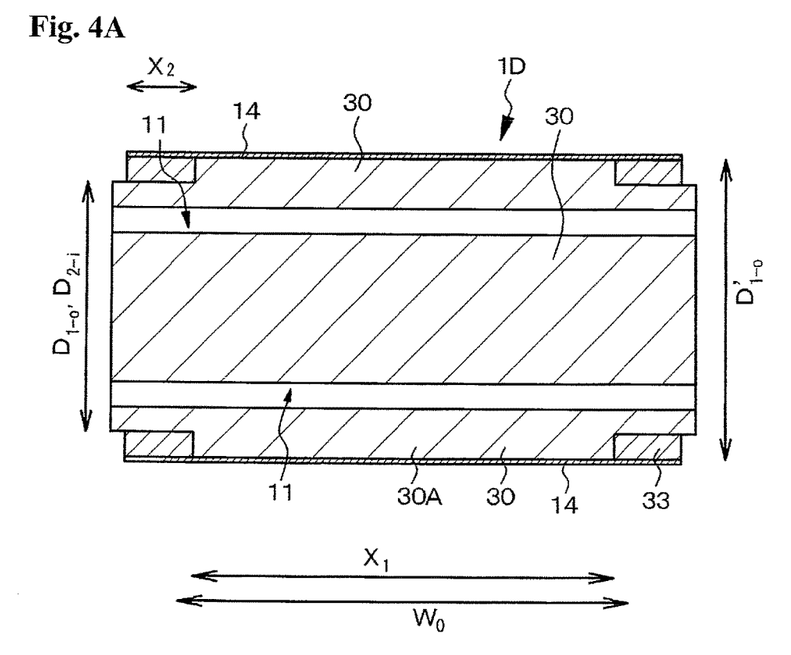
FIG. 4A is a cross sectional view schematically illustrating a shaping roll for melt extrusion molding according to embodiment 4
Figure 4B:
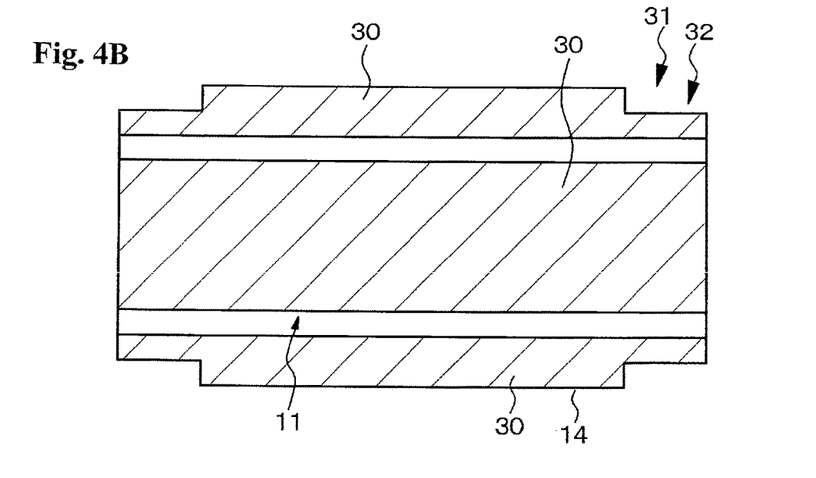
FIG. 4B is a cross sectional view schematically illustrating a roll body part according to embodiment 4.

Embodiment 4 relates to the shaping roll for melt extrusion molding, the shaping roll assembly for melt extrusion molding, and the melt extrusion molding method according to the second aspect of the invention. FIG. 4A is a cross sectional view schematically illustrating a shaping roll (first roll) 1D for melt extrusion molding according to embodiment 4 when the first roll 1D is taken along a virtual plane including the axial line and FIG. 4B is a cross sectional view schematically illustrating a roll body part 30. A conceptual view illustrating the disposition of the die and the shaping roll assembly for melt extrusion molding is the same as that illustrated in FIG. 1B.

The first roll 1D according to embodiment 4 is a shaping roll for melt extrusion molding used for melt extrusion molding of thermoplastic resin and comprises the roll body part 30 having the heat medium passage 11 internally and cutouts 32 on outer surfaces of both end portions 31 and cylindrical members 33 fitted into the cutouts 32 in the both end portions 31 of the roll body part 30. The roll body part 30 is made of a first metal material having a thermal conductivity of 40 W/m·K or more, the cylindrical members 33 are made of a second metal material having a thermal conductivity of 20 W/m·K or less, and the cylindrical members 33 are at least partially joined to the cutouts 32 of the roll body part 30. The first metal material of the roll body part 30 and the second metal material of the cylindrical members 33 are specifically indicated in Table 7 below.

The cylindrical members 33 are shrink-fitted to the roll body part 30. The value of the inner diameter $D_{2-i}$ of the cylindrical members 33 at normal temperatures, the outer diameter $D_{1-o}$ in the cutouts 32 of the roll body part 30 at normal temperatures, and an outer diameter $D'_{1-o}$ in a portion 30A of the roll body part 30 between the cutout 32 and the cutout 32 at normal temperatures are indicated in Table 7 below. That is, the shrink-fitting margin is assumed to be 0.15 mm. In addition, the wall thickness of the cylindrical members 33 is assumed to be 8 mm. Also in embodiment 4, the roll body part 30 is assumed to be a so-called drilled roll having the heat medium passage 11 formed into a circular pipe by a cutting drill so as to extend from the side of the roll body part 30 in parallel with the axial direction. The number of heat medium passages 11 is essentially arbitrary. Thermal oil is used as the heat medium of the roll body part 30. Although the linear expansion coefficient of the second metal material of the cylindrical members 33 is slightly larger than the linear expansion coefficient of the first metal material of the roll body part 30, it is possible to prevent the cylindrical members 33 from being loosened by making the shrink-fitting margin slightly larger. In some cases, the end parts of the cylindrical members 33 may be spot-welded to the roll body part 30 to prevent them from rotating idle or being removed.

On the surfaces of the roll body part 30 and the cylindrical members 33, the same plating layer 14 as in embodiment 1 was formed. In addition, as in embodiment 2, the same rubber roll made of fluororesin similar as the second roll 2 in embodiment 1 was used as the second roll 2.

When the width of the sheet molded article shaped by melt extrusion molding using the shaping roll for melt extrusion molding is $W_0$ and the length of the portion of the roll body part 30 between the cutouts 32 of the roll body part 30 is $X_1$, the following expression is met.

$W_0 > X_1$

Alternatively, the following expression is met.

$30 \text{ mm} \leq W_0 - X_1 \leq 300 \text{ mm}$

In addition, when the length of the cylindrical members 33 is $X_2$, the following expression is met.

$30 \text{ mm} \leq X_2 \leq 300 \text{ mm}$

In addition, the following expression is met.

$(X_1 + 2 \cdot X_2) > W_0 + 30 \text{ (mm)}$

The values of $X_1$ and $X_2$ and the value of $W_0$ are specifically indicated in Table 7 below. The state in which the region of $X_2$ overlaps the end part of the sheet molded article by 30 mm or more is preferable.

TABLE 7

| First metal material | S45C |
|---|---|
| Thermal conductivity | 45 W/m · K |
| Linear expansion coefficient | $12 \times 10^{-6}$ mm/mm · K |
| Second metal material | SUS309 |
| Thermal conductivity | 14 W/m · K |
| Linear expansion coefficient | $15 \times 10^{-6}$ mm/mm · K |
| $D_{1-o}$ | 384.0 mm |
| $D'_{1-o}$ | 400.0 mm |
| $D_{2-i}$ | 383.7 mm |
| $D_{2-o}$ | 400.0 mm |
| $X_1$ | 300 mm |
| $X_2$ | 195 mm |
| $W_0$ | 450 mm |

In embodiment 4, polycarbonate resin (polycarbonate resin "lupilon E2000" manufactured by Mitsubishi Engineering-Plastics Corporation) was used as the thermoplastic resin. In addition, the nominal thickness of a sheet molded article (film molded article) obtained by a melt extrusion molding method according to embodiment 4 is 130 μm and the width $W_0$ is indicated in Table 7. The obtained sheet molded article (film molded article) is a light diffusion sheet (light diffusion film) as in embodiment 1 and a mat pattern is formed thereon.

Also in embodiment 4, a well-known melt extrusion molding apparatus is used to pass molten thermoplastic resin pushed out of the die through the gap between the first roll 1D and the second roll 2 and apply a pressure to the sheet type molten thermoplastic resin to obtain the sheet molded article (film molded article). The molding conditions are indicated in Table 8 below. The appearance of the obtained light diffusion sheet (light diffusion film) was good and the difference in the haze value was hardly observed between the middle part and the end part.

TABLE 8

| | |
|---|---|
| Die temperature | 280° C. |
| Line speed | 7 m/min |
| First roll temperature | 135° C. |
| Second roll temperature | 70° C. |
| Line pressure level | 6 kg/cm |

Although the invention has been described above based on preferable embodiments, the invention is not limited to these embodiments. The structures, composition, and materials used, melt extrusion molding conditions, and the like of the shaping roll for melt extrusion molding, the shaping roll assembly for melt extrusion molding, and the melt extrusion molding apparatus described in the embodiments are only examples and may be changed as appropriate. For example, the plating layer described in embodiment 2 may be applied to embodiment 1 and embodiment 4 and the plating layer described in embodiment 1 may be applied to embodiment 2 and embodiment 3.

DESCRIPTION OF REFERENCE NUMERALS 1A, 1B, 1C, 1D: first roll
2: second roll
10, 20, 30: roll body part
11, 21: heat medium passage
12, 22: first cylinder
12A, 12B: extension part of first cylinder
13, 23, 113: second cylinder
14, 24: plating layer
25: dividing wall
31: both end portions of first roll 1D
32: cutout
33: cylindrical member

The invention claimed is:

1. A shaping roll for melt extrusion molding used for melt extrusion molding of thermoplastic resin, the shaping roll for melt extrusion molding comprising:
a metal roll body having a heat medium passage internally;
a first cylinder covering a surface of a middle portion of the roll body part;
a second cylinder covering surfaces of both end portions of the roll body part;
the first cylinder comprising a first metal material having a thermal conductivity of 40 W/m·K or more;
the second cylinder comprising a second metal material having a thermal conductivity of 20 W/m·K or less; and
the first cylinder and the second cylinder are at least partially joined to each other.

2. The shaping roll for melt extrusion molding according to claim 1, wherein the second cylinder covers the surfaces of the both end portions of the roll body part with an extension part of the first cylinder.

3. The shaping roll for melt extrusion molding according to claim 1, wherein an extension part of the first cylinder covers a surface of the second cylinder.

4. The shaping roll for melt extrusion molding according to claim 1, wherein a plating layer is formed on at least a surface of the first cylinder.

5. The shaping roll for melt extrusion molding according to claim 4, wherein the plating layer is selected from a group including a copper plating layer, a nickel plating layer, an electroless nickel-phosphorus plating layer, an electrolytic nickel-phosphorus plating layer, and a chrome plating layer.

6. The shaping roll for melt extrusion molding according to claim 4, wherein a surface of the plating layer comprises a mat pattern, a prism pattern, or a micro lens array pattern.

7. The shaping roll for melt extrusion molding according to claim 1, wherein the first metal material comprises carbon steel, chrome steel, or chrome molybdenum steel.

8. The shaping roll for melt extrusion molding according to claim 1, wherein the second metal material comprises nickel steel or stainless steel.

9. The shaping roll for melt extrusion molding according to claim 1, wherein the roll body part comprises the first metal material.

10. A shaping roll for melt extrusion molding used for melt extrusion molding of thermoplastic resin, the shaping roll for melt extrusion molding comprising:
a roll body part having a heat medium passage internally and cutouts on outer surfaces of both end portions; and
a cylindrical member fitted into the cutouts in the both end portions of the roll body part;
the roll body part comprising a first metal material having a thermal conductivity of 40 W/m·K or more;
the cylindrical member comprising a second metal material having a thermal conductivity of 20 W/m·K or less; and
the cylindrical member being at least partially joined to the cutouts of the roll body part.

11. The shaping roll for melt extrusion molding according to claim 10, wherein a plating layer is formed on surfaces of the roll body part and the cylindrical members.

12. The shaping roll for melt extrusion molding according to claim 11, wherein the plating layer is selected from a group including a copper plating layer, a nickel plating layer, an electroless nickel-phosphorus plating layer, an electrolytic nickel-phosphorus plating layer, and a chrome plating layer.

13. The shaping roll for melt extrusion molding according to claim 11, wherein a surface of the plating layer comprises a mat pattern, a prism pattern, or a micro lens array pattern.

14. The shaping roll for melt extrusion molding according to claim 10, wherein the first metal material comprises carbon steel, chrome steel, or chrome molybdenum steel.

15. The shaping roll for melt extrusion molding according to claim 10, wherein the second metal material comprises nickel steel or stainless steel.

16. A shaping roll assembly for melt extrusion molding comprising:
a shaping roll for melt extrusion molding;

a pressure roll disposed facing the shaping roll for melt extrusion molding;

the shaping roll for melt extrusion molding comprising
a metal roll body having a heat medium passage internally;
a first cylinder covering a surface of a middle portion of the roll body part;
a second cylinder covering surfaces of both end portions of the roll body part;
the first cylinder comprising a first metal material having a thermal conductivity of 40 W/m·K or more;
the second cylinder comprising a second metal material having a thermal conductivity of 20 W/m·K or less; and
the first cylinder and the second cylinder being at least partially joined to each other.

17. A shaping roll assembly for melt extrusion molding comprising:
a shaping roll for melt extrusion molding;
a pressure roll disposed facing the shaping roll for melt extrusion molding;
the shaping roll for melt extrusion molding comprising
a roll body part having a heat medium passage internally and cutouts on outer surfaces of both end portions;
a cylindrical member fitted into the cutouts in the both end portions of the roll body part;
the roll body part comprising a first metal material having a thermal conductivity of 40 W/m·K or more;
the cylindrical member comprising a second metal material having a thermal conductivity of 20 W/m·K or less; and
the cylindrical member being at least partially joined to the cutouts of the roll body part.

18. A melt extrusion molding method using a shaping roll assembly for melt extrusion molding comprising a shaping roll for melt extrusion molding and a pressure roll disposed facing the shaping roll for melt extrusion molding, comprising steps of: pushing molten thermoplastic resin out from a die;
passing molten thermoplastic resin through a gap between the shaping roll for melt extrusion molding and the pressure roll to obtain a sheet molded article;
the shaping roll for melt extrusion molding comprising:
a metal roll body having a heat medium passage internally;
a first cylinder covering a surface of a middle portion of the roll body part;
a second cylinder covering surfaces of both end portions of the roll body part;
the first cylinder comprises a first metal material having a thermal conductivity of 40 W/m·K or more;
the second cylinder comprises a second metal material having a thermal conductivity of 20 W/m·K or less; and
the first cylinder and the second cylinder are at least partially joined to each other.

19. A melt extrusion molding method using a shaping roll assembly for melt extrusion molding including a shaping roll for melt extrusion molding and a pressure roll disposed facing the shaping roll for melt extrusion molding, comprising steps of:
pushing molten thermoplastic resin out from a die;
passing molten thermoplastic resin through a gap between the shaping roll for melt extrusion molding and the pressure roll to obtain a sheet molded article;
the shaping roll for melt extrusion molding comprising:
a roll body part having a heat medium passage internally and cutouts on outer surfaces of both end portions;
a cylindrical member fitted into the cutouts in the both end portions of the roll body part;
the roll body part comprising a first metal material having a thermal conductivity of 40 W/m·K or more;
the cylindrical member comprising a second metal material having a thermal conductivity of 20 W/m·K or less; and
the cylindrical member being at least partially joined to the cutouts of the roll body part.

20. The melt extrusion molding method according to claim 18, wherein the obtained sheet molded article has a thickness from 0.05 mm to 0.5 mm.

21. The melt extrusion molding method according to claim 18, wherein the thermoplastic resin is selected from a group including polycarbonate resin, acrylic resin, polystyrene resin, thermoplastic polyester resin, annular polyolefin resin, and polymethyl-1-pentene resin.

22. The melt extrusion molding method according to claim 18, wherein the obtained sheet molded article comprises a light diffusion film or a brightness enhancement sheet.

* * * * *